US008566583B2

United States Patent
Kauppinen et al.

(10) Patent No.: US 8,566,583 B2
(45) Date of Patent: Oct. 22, 2013

(54) PACKET HANDLING IN A MOBILE IP ARCHITECTURE

(75) Inventors: Tero Kauppinen, Espoo (FI); Petri Jokela, Espoo (FI); Heikki Mahkonen, Helsinki (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 913 days.

(21) Appl. No.: 12/516,020

(22) PCT Filed: Nov. 30, 2006

(86) PCT No.: PCT/EP2006/069133
§ 371 (c)(1),
(2), (4) Date: Feb. 23, 2010

(87) PCT Pub. No.: WO2008/064719
PCT Pub. Date: Jun. 5, 2008

(65) Prior Publication Data
US 2010/0153715 A1    Jun. 17, 2010

(51) Int. Cl.
*H04L 29/06*    (2006.01)
*H04W 4/00*    (2009.01)
*H04J 3/24*    (2006.01)
*H04L 12/28*    (2006.01)

(52) U.S. Cl.
USPC ........... 713/160; 370/328; 370/349; 370/389; 370/392; 709/214

(58) Field of Classification Search
None
See application file for complete search history.

(56) References Cited

U.S. PATENT DOCUMENTS

| 7,430,204 | B2 * | 9/2008 | See ................................ 370/392 |
| 7,756,073 | B2 * | 7/2010 | Le et al. ......................... 370/328 |
| 8,139,571 | B2 * | 3/2012 | Khalil et al. ................... 370/389 |
| 2006/0173968 | A1 * | 8/2006 | Vaarala et al. ................ 709/214 |
| 2007/0081512 | A1 * | 4/2007 | Takeda et al. ................. 370/349 |
| 2008/0101366 | A1 * | 5/2008 | Venkitaraman et al. ...... 370/392 |

FOREIGN PATENT DOCUMENTS

EP     1 580 958 A    9/2005
WO    WO 03/090041 A    10/2003

OTHER PUBLICATIONS

Jin Tang et al: "Mobile IPv4 secure firewall traversal with deployment of foreign agents" Wireless Communications and Networking Conference, 2005 IEEE New Orleans, LA, USA Mar. 13-17, 2005, Piscataway, NJ, USA,IEEE, Mar. 13, 2005, pp. 1533-1538, XPOI0791404 ISBN: 0-7803-8966-2.

Krishnamurthi Get al: "Providing end-to-end location privacy in IP-based mobile communication" Wireless Communications and Networking Conference, 2004. WCNC. 2004 IEEE Atlanta, GA, USA Mar. 21-25, 2004, Piscataway, NJ, USA,IEEE, vol. 2, Mar. 21, 2004, pp. 1264-1269, XPOI0708459 ISBN: 0-7803-8344-3.

(Continued)

*Primary Examiner* — Shin-Hon Chen (57) ABSTRACT

A method of handling IP packets transmitted from a correspondent node to a mobile node via an intermediate node using the IPsec security protocol. The method comprises, at the correspondent node, identifying specified selector information within the part of the packet to be encrypted, and incorporating the identified information or a digest thereof into a header part of the packet which is to be sent unencrypted, transmitting the packet from the correspondent node to said intermediate node, and, at the intermediate node, receiving the transmitted packet and identifying a policy to be applied to the packet using said information or digest contained in the packet, and applying the policy to the packet.

20 Claims, 5 Drawing Sheets

(56) References Cited

OTHER PUBLICATIONS

Devarapalli Azaire Networks F Dupont Celar V: "Mobile IPv6 Operation with IKEv2 and the revised IPsec Architecture" IETF Standard-Working-Draft, Internet Engineering Task Force, IETF, CH, vol. mip6, No. 7, Oct. 22, 2006, XP015047938.

Wakikawa Keio University T Ernst Keio University / Wide K Nagami Intec Netcore R: "Multiple Care-of Addresses Registration" IETF Standard-Working-Draft, Internet Engineering Task Force, IETF, CH, vol. monami6, No. 1, Oct. 2006, XP015047956.

* cited by examiner

Figure 1

```
 0                   1                   2                   3
 0 1 2 3 4 5 6 7 8 9 0 1 2 3 4 5 6 7 8 9 0 1 2 3 4 5 6 7 8 9 0 1
                                +-+-+-+-+-+-+-+-+-+-+-+-+-+-+-+-+
                                | Option Type   | Option Length |
+-+-+-+-+-+-+-+-+-+-+-+-+-+-+-+-+-+-+-+-+-+-+-+-+-+-+-+-+-+-+-+-+
|                         Option Data                           |
+-+-+-+-+-+-+-+-+-+-+-+-+-+-+-+-+-+-+-+-+-+-+-+-+-+-+-+-+-+-+-+-+
```

Figure 3

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    Hash Value...
+-+-+-+-+-+-+-+-+-+-+-+-+-+-+-+-+-+-+-+-+-+-+-+-+-+-+-+-+-+-+-+-+
```

- - - - - - = optional

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   Hash Len    |  Hash Value...
+-+-+-+-+-+-+-+-+-+-+-+-+-+-+-+-+-+-+-+-+-+-+-+-+-+-+-+-+-+-+-+-+
|  Purpose...
+-+-+-+-+-+-+-+-+-+-+-+-+-+-+-+-+-+-+-+-+-+-+-+-+-+-+-+-+-+-+-+-+
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|          Source Port          |       Destination Port        |
+-+-+-+-+-+-+-+-+-+-+-+-+-+-+-+-+-+-+-+-+-+-+-+-+-+-+-+-+-+-+-+-+
|            Length             |           Checksum            |
+-+-+-+-+-+-+-+-+-+-+-+-+-+-+-+-+-+-+-+-+-+-+-+-+-+-+-+-+-+-+-+-+
|                            Data...
+-+-+-+-+-+-+-+-+-+-+-+-+-+-+-+-+-+-+-+-+-+-+-+-+-+-+-+-+-+-+-+-+
```

Figure 7

```
+-+-+-+-+-+-+-+-+-+-+-+-+-+-+-+-+-+-+-+-+-+-+-+-+-+-+-+-+-+-+-
| Original IPv4 | UDP | Hash UDP |  Original Packet...
+-+-+-+-+-+-+-+-+-+-+-+-+-+-+-+-+-+-+-+-+-+-+-+-+-+-+-+-+-+-+-
```

PACKET HANDLING IN A MOBILE IP ARCHITECTURE

TECHNICAL FIELD

The present invention relates to packet handling in a Mobile IP architecture. The invention is applicable in particular, though not necessarily, to the routing of packets between Home Agents and Mobile Nodes, where the Mobile Nodes have multi-access capabilities.

BACKGROUND

In order to provide a stable IP connection for user terminals moving within and between (access) networks, the Internet Engineering Task Force (IETF) has specified a protocol known as Mobile IP. Mobile IP for IPv6 is specified in RFC 3775—"Mobility Support in IPv6". According to Mobile IPv6, the current location of a user terminal or Mobile Node (MN) within the global network is stored in a node called Home Agent (HA). The HA dynamically updates the current location of the MN as it moves, in order to make the MN reachable for other nodes trying to connect to it. These other nodes are referred as Correspondent Nodes (CN). Mobile IP for IPv4 is specified in RFC 3344.

A MN is allocated a stable IP address, which is referred as a Home Address (HoA). When the MN is away from its home network (i.e. the network which assigned the HoA), the HA receives traffic on the behalf of the MN and then tunnels it towards the MN, i.e. communications between the MN and the CN are sent via the HA. The current location of the MN is indicated by a care-of address (CoA), and thus when the HA needs to forward a packet to the MN's current location, the HA must map the HoA to CoA. The mapping between HoA and CoA is called a "binding".

Mobile IPv6 defines a mechanism referred to as "route optimization" which can be used to optimise the route taken by traffic between the MN and the CN, removing the HA from the route. However, route optimization is not a mandatory part of the protocol and it may not always be available for various reasons. For example, some Network Address Translation (NAT) servers may cause problems for route optimization effectively rendering its use impossible.

Recent developments in mobile communication have introduced a need to support multi-access capabilities for MNs. Consider for example a MN which is simultaneously reachable at two different CoA. One of the CoAs may be associated, for example, with a 3G access network whilst the other may be associated with a WLAN access network. The "monami6" IETF working group is currently working on the provision of multi-access support in Mobile IPv6.

MNs equipped with more than one (access) communication interface require a mechanism that controls the usage of the interfaces for communication, i.e. to direct flows to particular interfaces. Such a mechanism will apply a defined policy or policies according to selectors associated with communication flows. A typical selector set for a given flow may include the source and destination addresses for packets of the flow. In the case of Mobile IPv6, this control mechanism will be implemented within the HA that is responsible for data forwarding to a MN. When data destined to the MN's HoA arrives to the HA, the HA decides to which interface (of the MN) the data should be forwarded.

IPsec (IETF RFC 2401—"Security Architecture for the Internet protected traffic") is an Internet protocol intended to provide encryption and authentication for IP data flows. It can be expected that IPsec will be used to secure end-to-end data flows between MNs and CNs in cases where route optimization is not employed, i.e. data flows pass through a HA. The selectors used to select a policy to apply to a data flow will typically be located within the inner IP header of an IPsec packet. As IPsec may encrypt this inner header, the selectors will not be available to the HA and therefore the home agent will not be able to select specific policy suited to the selectors and must apply some default policy. In the case of a MN having multi-access capabilities, this means that IPsec protected flows must be routed via a default communication interface which may not be optimal.

A similar situation may arise at other nodes within the transport path and which are required to apply a selector-dependent policy [see IETF RFC 4140—"Hierarchical Mobile IPv6 Mobility Management (HMIPv6)]". Policies may not be related to selection of an appropriate communication interface, but may relate to, for example, a Quality of Service (QoS) to be applied or a decision on transmitting over multiple interfaces, e.g. bi-casting (or more generally n-casting).

SUMMARY

It is an object of the present invention to provide a means whereby an intermediate node, for example a Home Agent, can apply policies to packets which are dependent upon data within the packets normally secured by IPsec.

According to a first aspect of the present invention there is provided a method of handling IP packets transmitted from a correspondent node to a mobile node via an intermediate node using the IPsec security protocol, the method comprising:

at the correspondent node, identifying specified selector information within the part of the packet to be encrypted, and incorporating the identified information or a digest thereof into a header part of the packet which is to be sent unencrypted;

transmitting the packet from the correspondent node to said intermediate node; and at the intermediate node, receiving the transmitted packet and identifying a policy to be applied to the packet using said information or digest contained in the packet, and applying the policy to the packet.

Embodiments of the invention allow certain normally encrypted data to be provided in the clear to the intermediate node. An assumption that is made is that providing this information in the clear is not a security risk, or represents only an acceptable risk.

An preferred method for generating a digest of the selector information is to apply a hash function to the information, the resulting hash value being incorporated into said header part.

In the case where said IP packets are IPv6 packets, said header part may be an extension header of the IPv6 packet. More preferably, said extension header is one of a destination options header and a hop-by-hop extension header. Alternatively, said header part is an IPv6 flow label within the outer IPv6 header. In the case where said IP packets are IPv4 packets, said header part may be one of an IPv4 header option or a UDP header.

The invention is applicable in particular to the case where said packets are constructed and handled according to the Mobile IPv6 protocol, and said intermediate node is a Home Agent. Considering the case where said mobile node is a multi-access capable mobile node, said policy identifies the access network and/or technology over which the packet is to be forwarded. In this case, the identified information may comprise one or more of the original source address, destination address, source port number, and destination port number of the original packet, which allows the Home Agent to select the interface, i.e. care-of-address, over which the packet is to be forwarded.

It will be appreciated that where the Home Agent fails to recognise or identify a policy associated with said information or digest thereof, a default policy can applied to the packet by the Home Agent. In this case, upon receipt of the packet by the Mobile Node, the mobile node may send a binding update to the Home Agent identifying the policy to be applied to future packets containing the same information or digest.

According to a second aspect of the present invention there is provided a user terminal arranged in use to send IP packets to a mobile node via an intermediate node applying policies to packets on behalf of the mobile node, the user terminal comprising:

- a processor for identifying selector information within an IP packet and for incorporating that information or a digest thereof into a header part of the packet, and for employing the IPsec security policy to encrypt at least a part of the packet excluding said header part; and
- a transmitter arranged in use to send the part encrypted packet to said intermediate node.

According to a third aspect of the present invention there is provided a node for use within an IP communication network, the node comprising:

- a receiver for receiving an IP packet from a correspondent node, the packet being secured using the IPsec security protocol; and
- a processor for identifying selector information contained within an unencrypted header part of the received packet, and for identifying a policy to be applied to the packet using the selector information, and for applying the policy to the packet.

DETAILED DESCRIPTION

Figure 1:
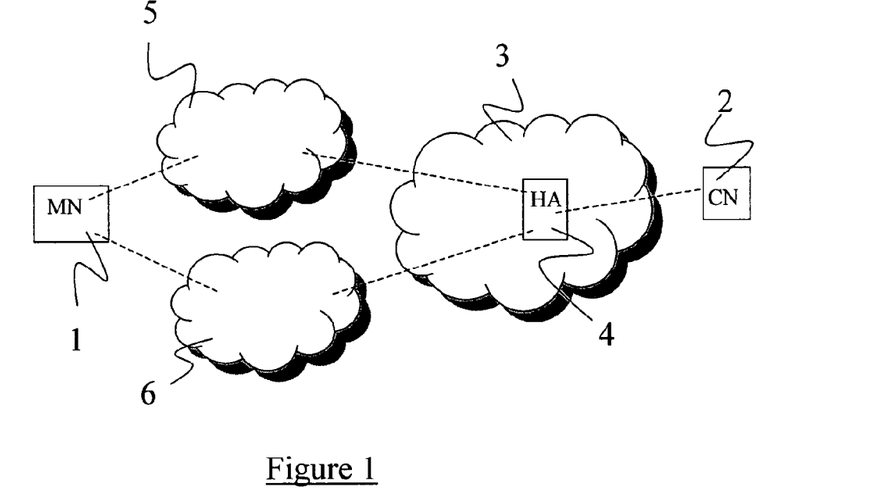
FIG. 1 illustrates schematically a communications system employing Mobile IPv6.

FIG. 1 illustrates schematically a communications system for enabling communication between a pair of user terminals, a first of which is identified as a Mobile Node (MN) 1 and a second of which is referred to as a Correspondent Node (CN) 2. The MN 1 subscribes to a home network 3 which facilitates roaming by its subscribers using a Home Agent (HA) 4. As has already been described, the HA allocates a stable IPv6 address to the MN, and the MN uses Binding Updates (BUs) to keep the HA informed of its current care-of-address (CoA). In the scenario shown in FIG. 1, the MN 1 has roamed into a location where two different access networks 5,6 (or technologies, e.g. WLAN and Ethernet)) are simultaneously available. The exact nature of these networks is not of importance to this discussion. What is of importance is that each access network or technology allocates to the MN a care-of-address. The MN informs the HA of the two care-of-addresses using a single BU message. It will be appreciated that the CN may also be a roaming MN employing Mobile IP, although this is not illustrated in the Figure.

It is assumed that the MN and the CN secure their communications using IPsec. As such, the inner IP headers of IP packets will be encrypted. For all packets to be sent from the CN to the MN, prior to performing the encryption step, the CN applies a hash function to the protocol header fields that form the selectors (for example the source IP address, destination IP, source port, destination port, protocol version number) for the routing policies within the HA, to generate a hash value. The hash function might be SHA-1, or any other suitable function. The hash value can have any appropriate length. The calculated hash value is then inserted into one of the "extension" headers which may follow the outer IPv6 header.

Figure 2:
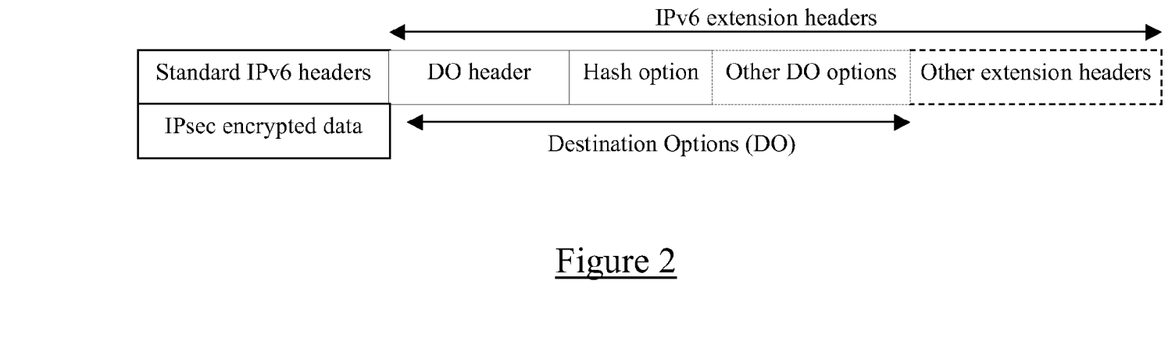
FIG. 2 illustrates schematically the structure of an IPv6 IPsec secured packet incorporating a hash option within the Destination Options field.

A preferred extension header for carrying the hash value is an IPv6 destination options header. This is illustrated schematically in FIG. 2. It must be noted that these headers are not part of the encrypted section of the packet. Expected behaviour according to IPv6 is that the destination headers are only looked at by the destination node for the packet (i.e. the MN in this case). Use of a destination header to carry the hash value is therefore contrary to expected behaviour. An alternative candidate location for the hash value is the "hop-by-hop" extension header. However, as the hop-by-hop header is processed by every node in the path, this leads to performance deterioration and is therefore not an optimal choice. Yet another candidate location for the hash value is the IPv6 "flow label" within the outer IPv6 header (n.b. the flow label is not contained within an extension header). However, the flow label is not well defined, and some applications may use it for their own purposes which means that overwriting of an existing IPv6 flow label can occur.

Considering further the use of a destination options extension header, the existing IPv6 protocol makes it possible to define a new type of option within the destination options extension header such that options of this type will be ignored by nodes that do not recognise it. This ensures compatibility within networks (or network nodes) that do not support the new option type.

Figure 3:
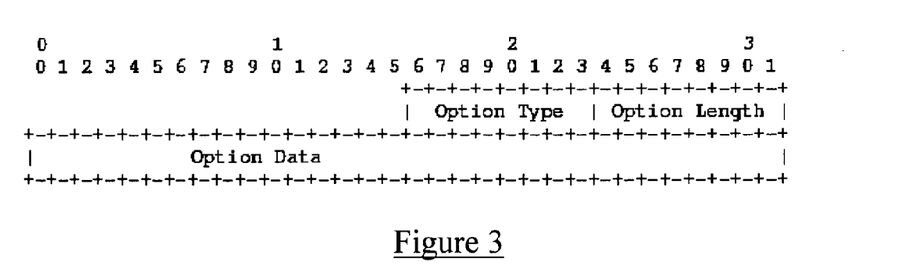
FIG. 3 shows the structure of a destination options extension header of an IPv6 packet.
Figure 4:
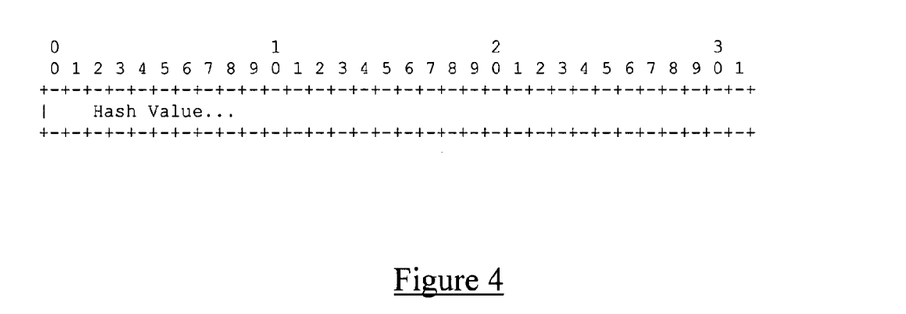
FIG. 4 shows the structure of an option data field of the extension header of FIG. 3 and containing a hash value.

Each option within the destination options header uses type-length-value (TLV) encoding where each options is defined as illustrated in FIG. 3. The Option Type for the new hash option is defined in such a way that the highest-order two bits (bits 16 and 17) are not set. Thus, according to IETF RFC2460, if the HA does not recognize the option, the setting of these highest order bits will cause the HA to skip over this option and continue processing the header. This disclosure does not define the exact option type value. The "Option Length" field is set to the length of the hash value in octets. The actual hash value is stored in the Option Data field using the format shown in FIG. 4. Appropriate "padding" may be added at the end of the hash option field.

When the HA receives a packet whose destination is the HoA, it can read the hash value from the destination options extension header as this is not encrypted. The HA maintains a mapping between expected hash values and policies. The extracted hash value is used to obtain the appropriate policy from the mapping. This policy defines which of the (two or possibly more) registered care-of-addresses should be used as the forwarding address for the packet. The HA adds a further IPv6 header to the front of the packet containing as the destination address the appropriate care-of-address.

Figure 5:
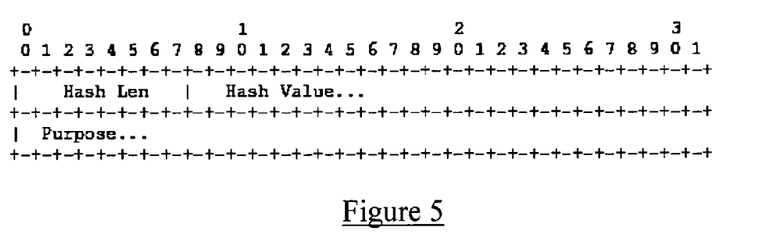
FIG. 5 illustrates a Binding Update message containing a policy code field.

In the event that there is no policy matching the received hash value, the HA can use any of the MN's current bindings for a given HoA (the MN can have more than one HoA, i.e. the node is multi-homed). If the MN receives a packet from the HA via a wrong or inappropriate interface, the MN will determine that the HA does not have the proper policy information. The MN can then update the HA mapping database by sending to the HA a BU message containing the hash value. The binding update contains an appropriate policy code within a policy field of the BU to indicate the purpose of the hash value. This is illustrated in FIG. 5. The HA returns a Binding Acknowledgement (BA) to the MN.

In order to allow the BU message to contain the update information, this message is extended by defining a new mobility option ("hash" option). The general format of the mobility options is defined in Section 6.2.1 of IETF RFC 2460. New option type can be added without introducing compatibility issues as the RFC states: "When processing a Mobility Header containing an option for which the Option Type value is not recognized by the receiver, the receiver must quietly ignore and skip over the option, correctly handling any remaining options in the message". The exact value of the new 'Option Type' field is left open here.

Within the hash option, the 'Option Length' field must be set to the length of the hash whereas 'Option Data' field contains the hash value. The original BU format includes the care-of address, and thus including this new mobility option carrying the hash value for that specific care-of address implicitly creates a mapping (i.e. a policy) which will be understood by the HA.

When including the hash option in a BU message, the MN should set the Acknowledge (A) bit to on. If the HA recognises the hash option, it must include the received hash option in the BA message which is returned to the MN as a result of the setting of the A bit. This will ensure that the MN receives confirmation both that the HA received the message and that the HA supports the hash functionality. If the MN receives a BA without the hash option included, it should interpret this as a sign that the HA did not recognise the hash option. In this case the MN should stop including the hash option in further BUs sent to the HA.

Figure 10:
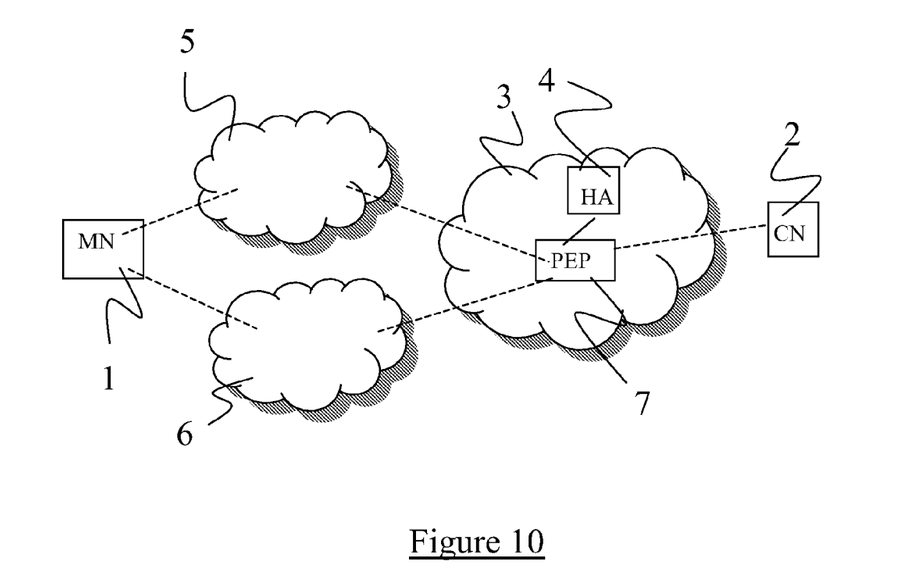
FIG. 10 illustrates schematically a communications system employing Mobile IPv6 and comprising a Policy Enforcement Point.

If the node required to make a policy decision is other than the HA, the HA is required to provide the received mapping information to the node. FIG. 10 illustrates as an example the case where the policy decision is made at a Policy Enforcement Point (PEP) 7. Policies are provided to the PEP by the Home Agent 4, which continues to receive BU messages from the MN. Details of such a protocol are, however, beyond the scope of this discussion.

Figure 6:
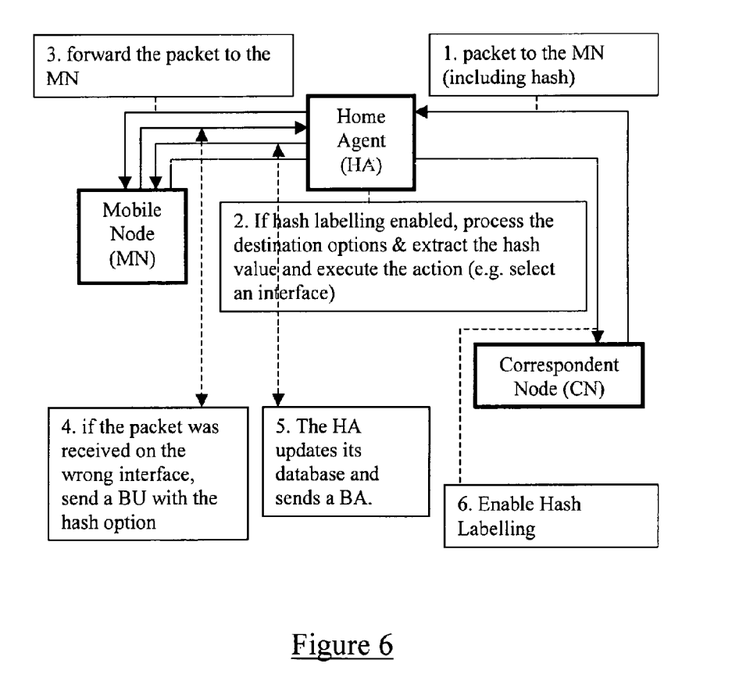
FIG. 6 illustrates schematically a signalling flow of Mobile IPv6 packets within the system of FIG. 1.

FIG. 6 illustrates the message flow within a Mobile IPv6 architecture making use of hash values as described above, where the HA determines whether the hash labelling functionality is enabled or disabled before processing a hash option. It will be appreciated that, where interface selection is based upon only the source and destination address of a packet and these are contained within the plain text outer header of the packet, there is no need to enable the hash labelling functionality at the HA. It is only when the selector contains otherwise encrypted data that the functionality is enabled. To this end, the HA maintains for each MN a list of CNs for which the functionality is enabled (i.e. where the default is that the functionality is disabled) or a list of CNs for which the functionality is disabled (i.e. where the default is that the functionality is enabled). A MN can add a CN to this list (enabled or disabled) by sending a BU message to the HA, containing in the hash option field the IP address of the CN to which the action applies (nb. the address is not hashed). In the case where the action is to enable the functionality, the BU message will contain a further hash option field containing the hash value which is mapped to a given care-of-address.

Turning now to IPv4, this protocol does not define the destination options extension header and their usage is therefore limited to IPv6 only. However, IPv4 headers may contain options, and a new option type can be defined to carry a hash value (see RFC 1122—"Requirements for Internet Hosts—Communication Layers"). IPv4 states that "The IP and transport layer MUST each interpret those IP options that they understand and silently ignore the others". Unfortunately, IPv4 option handling is sometimes problematic, and therefore usage of IPv4 options is not recommended.

Figure 7:
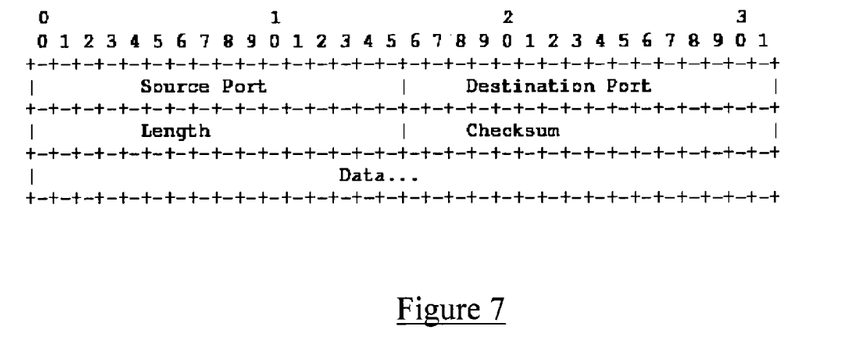
FIG. 7 shows the structure of a UDP packet according to IPv4.
Figure 8:
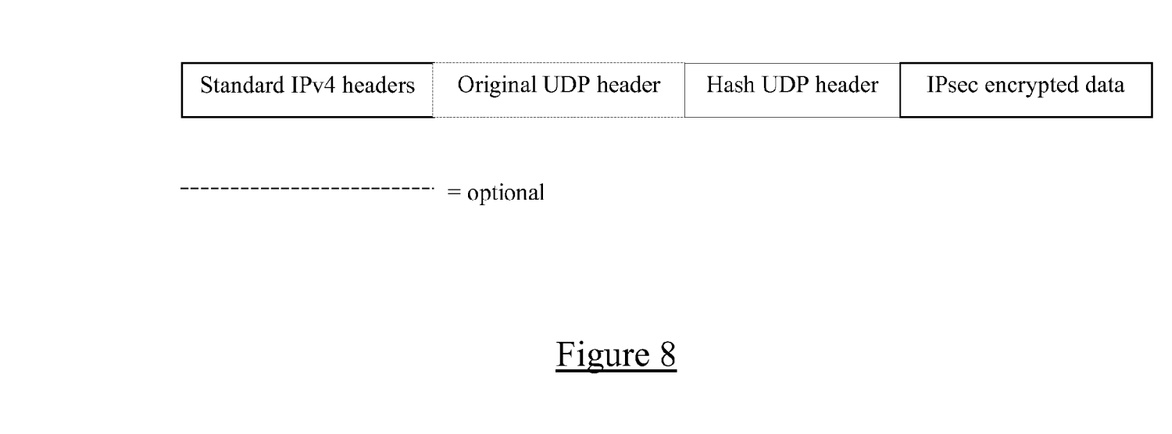
FIG. 8 illustrates schematically the structure of an IPv4 IPsec secured packet incorporating a Hash UDP header.
Figure 9:
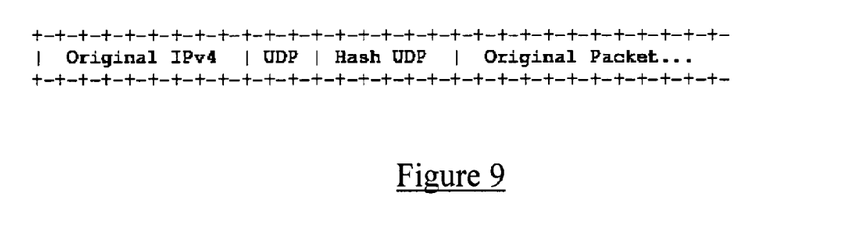
FIG. 9 shows the structure of an IPv4 packet containing multiple UDP headers.

As an alternative to the use of IPv4 options, the hash value may be carried by a UDP header (called here "Hash UDP") of the IP packet. UDP packets have the format shown in FIG. 7, where the overall IP packet structure including a UDP header is illustrated in FIG. 8. The Data field within the UDP header can be used to carry a variable length hash value. The Source Port and Destination Port values should be set to some known value(s) which, however, are not defined here. If the original IP packet already contains a UDP header, the new UDP header is inserted after the original UDP header (this order is critical), in which case the packet has the structure shown in FIG. 9.

When the HA receives an IPv4 packet sent to the MN's HoA, the HA can inspect the packet and search for the Hash UDP header. If this header is found, the hash value is extracted and the Hash UDP header is removed from the packet before forwarding it to the MN.

It will be appreciated that, if the HA does not support the required functionality, it will not remove the added UDP header (Hash UDP) from the packet. This is not a problem in the case when the MN supports the hash labelling as the MN can just remove the Hash UDP header. However, if neither the HA nor the MN support UDP based hash labelling, the packet will be dropped and the associated data lost. It is desirable therefore to disable hash labelling at the CN by default, and to turn this on only following receipt at the CN of a specific signal from the MN. Such a signal could be included in a BU message. In contrast, however, that if IPv4 options are used to carry the hash label, the hash labelling may be turned on by default.

In the use case described above, the hash value included in the IP packet is used to select an interface over which the packet is to be delivered. However, a hash value can be used for many other purposes as well. Examples of such usage are to select a quality of service and/or transmission control (n-casting). Purpose can be indicted in the "purpose" field of the BU message (see FIG. 5).

It will be appreciated that the use of a hash function is only one means whereby selector information can be revealed to the HA despite the use of IPsec. Other mechanisms are possible. For example, an appropriate label may be constructed by concatenating the source and the destination ports of the original packet. The use of the hash-based mechanism does of course have the advantage that it does not cause potentially confidential information to be leaked.

Assuming that the precise mechanism used to generate the selector information is pre-defined (e.g. the hash-based mechanism), negotiation of the mechanism between the MN and the CN is not required, and the mechanism can be turned on by default. However, in some environments, it might be desirable to not to have the hash labelling turned on by default. For this purpose the MN may send a signal to the CN to enable the use of the pre-agreed or selected mechanism. This signal can be incorporated into the next packet sent to the CN. Again, the signal can be included as an option within the destination options extension header in IPv6 or as an Option in IPv4.

It will be appreciated by the person of skill in the art that various modifications may be made to the above described embodiments without departing from the scope of the present invention.

The invention claimed is:

1. A method of handling Internet Protocol (IP) packets transmitted from a correspondent node to a mobile node via a home agent of the mobile node using Mobile IP and IPsec security protocols, the method comprising:
   at the correspondent node, identifying selector information within a part of an IP packet to be encrypted, and incorporating the selector information or a digest thereof into a header part of the IP packet which is to be sent unencrypted;
   transmitting the IP packet from the correspondent node to the home agent; and
   at the home agent, receiving the IP packet and identifying a policy to be applied to the IP packet using the selector information or the digest contained in the IP packet, and applying the policy to the IP packet.

2. The method of claim 1, wherein the correspondent node generates the digest of the selector information using a hash function applied to the selector information, and incorporates a resulting hash value into the header part.

3. The method of claim 1, wherein the IP packets are one of IPv6 packets and IPv4 packets.

4. The method of claim 3, wherein the IP packets are IPv6 packets and the header part is an extension header of the IPv6 packet.

5. The method of claim 4, wherein the extension header is one of a destination options header and a hop-by-hop extension header.

6. The method of claim 4, wherein the header part is an IPv6 flow label within an outer IPv6 header.

7. The method of claim 3, wherein the IP packets are IPv4 packets and the header part is one of an IPv4 header option or a User Datagram Protocol (UDP) header.

8. The method of claim 1, wherein the selector information comprises one or more of an original source address, destination address, source port number, and destination port number of the IP packet.

9. The method of claim 1, wherein the home agent removes the header part prior to forwarding the IP packet to the mobile node.

10. The method of claim 1, wherein the mobile node is a multi-access capable mobile node, and the policy identifies the access network and/or technology over which the IP packet is to be forwarded.

11. The method of claim 10, wherein the policy specifies a care-of-address for the mobile node.

12. The method of any claim 1, wherein, if the home agent fails to identify a policy associated with the selector information or the digest thereof, a default policy is applied to the IP packet.

13. The method of claim 12, comprising, upon receipt at the mobile node of the IP packet to which a default policy has been applied, causing a binding update to be sent to the home agent identifying the policy to be applied to future packets containing the the selector information or the digest.

14. The method of claim 1, comprising, for each mobile node, maintaining at the home agent a list of correspondent nodes for which the steps of identifying the policy and applying the policy are to be applied or are not to be applied, the method further comprising sending, from the mobile node to the home agent or to a node responsible for inserting policies into the home agent, a binding update message containing an IP address of a correspondent node for which the policies are to be identified or are not to be identified and, in a case where the policy is to be identified, the binding update message also containing the digest and identifying a corresponding policy.

15. A user terminal for sending Internet Protocol (IP) packets to a mobile node via a home agent applying policies to the IP packets on behalf of the mobile node, the user terminal comprising:
   a processor for identifying selector information within an IP packet and for incorporating the selector information or a digest thereof into an unencrypted header part of the IP packet, and for employing an IPsec security policy to encrypt at least a part of the IP packet excluding the header part; and
   a transmitter for sending a part encrypted IP packet to the home agent.

16. The terminal of claim 15, the processor generating the digest of the selector information using a hash function applied to the selector information, and to incorporate a resulting hash value into the header part.

17. The terminal of claim 16, the processor incorporating the resulting hash value into a destination options header of the IP packet, where the IP packet is an IPv6 packet.

18. A Mobile Internet Protocol (IP) compliant home agent for use within an IP communication network, the home agent comprising:
   a receiver for receiving an IP packet from a correspondent node, the IP packet being secured using an IPsec security protocol; and
   a processor for identifying selector information contained within an unencrypted header part of the IP packet, and for identifying a policy to be applied to the IP packet using the selector information, and for applying the policy to the IP packet.

19. The home agent of claim 18, the node being a Policy Enforcement Point.

20. The home agent of claim 18, wherein the processor identifies selector information contained within a destination options field of the IP packet.

* * * * *

UNITED STATES PATENT AND TRADEMARK OFFICE
CERTIFICATE OF CORRECTION

| | | |
|---|---|---|
| PATENT NO. | : 8,566,583 B2 | |
| APPLICATION NO. | : 12/516020 | |
| DATED | : October 22, 2013 | |
| INVENTOR(S) | : Kauppinen et al. | |

It is certified that error appears in the above-identified patent and that said Letters Patent is hereby corrected as shown below:

On the Title Page, in Item [56], under "OTHER PUBLICATIONS", in Column 2, Line 6, delete "Get al:" and insert -- G et al., --, therefor.

In the Specifications

Column 4, Line 8, delete "Ethernet))" and insert -- Ethernet) --, therefor.

In the Claims

Column 8, Line 3, in Claim 12, delete "any claim 1" and insert -- claim 1 --, therefor.

Column 8, Line 12, in Claim 13, delete "the the selector" and insert -- the selector --, therefor.

Signed and Sealed this
Fifteenth Day of July, 2014

Michelle K. Lee
*Deputy Director of the United States Patent and Trademark Office*